Patented Nov. 5, 1940

2,220,287

UNITED STATES PATENT OFFICE 2,220,287

VOLTOLIZATION PROCESS AND PRODUCTS THEREOF

Raphael Rosen, Elizabeth, N. J., assignor to Standard Oil Development Company, a corporation of Delaware No Drawing. Application February 1, 1937, Serial No. 123,476

8 Claims. (Cl. 204—31)

This application relates to an improved voltolization process and to the products thereby obtained. It relates more particularly to the preparation of improved polymers and condensation products from unsaturated normally liquid to solid derivatives of paraffinic materials of petroleum origin, such as the olefins obtained on dehydrogenation of petroleum waxes and petrolatums.

This application is a copending case with Serial No. 704,763, filed December 30, 1933, by the present inventor, and which issued on February 2, 1937, as Patent No. 2,069,273.

It has now been found that improved lubricating oils and higher molecular weight products of a plastic to solid nature can be obtained by subjecting such olefins to the voltolization process. This process involves subjecting the initial materials to the action of a high voltage, preferably high frequency silent electric discharge at atmospheric pressure. Such discharge is characterized by a visible glow and the treatment of oils therewith is known as a voltolization process.

A further object of this invention is to provide an improved method for preparing voltolized products from paraffinic materials with a lower power consumption than that ordinarily required when voltolizing the saturated paraffinic materials directly. In such operation considerable energy is required to activate the paraffinic molecules presumably by splitting out hydrogen therefrom. In the present process this initial removal of hydrogen is accomplished by chemical methods and the resulting dehydrogenated materials are then polymerized by voltolization, thereby affording economies in electrical energy.

In preparing the olefins to be subjected to this voltolization process, it is preferable to select the heaviest naturally occurring paraffinic oils or waxes, such as petrolatum and paraffin wax of petroleum origin. These relatively high molecular weight paraffinic initial materials may be rendered unsaturated by any suitable method. For example they may be first chlorinated, and then hydrogen chloride may be split out by heat to form olefins having substantially the original carbon structure of the initial materials. The paraffinic materials may also be subjected to direct dehydrogenation by heating in the presence of dehydrogenating catalysts such as alumina, active clay, and the like, or by mild cracking under conditions affording so short a time of treatment at the cracking temperature that the formation of polymerization products is largely avoided. An example of such a cracking operation is the destructive distillation of paraffin wax by heating in a pot still at a pressure preferably below about 50 lbs. per square inch, the cracked products being immediately withdrawn in the vapor phase from the reaction zone without substantial reflux, and then quickly cooled and condensed.

The cracking should not be so drastic as to produce large amounts of gasoline, but is preferably sufficient to produce a highly unsaturated heavy fraction.

The cracked or otherwise dehydrogenated materials should be condensed alone in order to form the preferred products which will be later described in more detail. It is also possible to condense the cracked materials with cyclic hydrocarbons such as benzol or naphthalene or their hydrogenated derivatives which are preferably used in relatively small quantities to form condensation nuclei.

The process of voltolization consists in subjecting the material to the action of high tension silent electric discharges, preferably of an alternating current. The treatment is generally carried out under vacuum. The pressure may be varied from .001 mm. to .01 atmosphere, .1 atmosphere, .5 atmosphere, or even as high as .8 atmosphere. The voltage used is preferably in the range of 4,000. to 10,000 volts, although higher voltages such as 20,000 or even 50,000 volts may be used, especially when good dielectrics are available. The frequency of the alternating current may be as low as 60 cycles and as high as 1200, 3000, 10,000 or more cycles.

In the usual voltolization processes, the temperature during the treatment with silent electric discharges is maintained at about room temperature or substantially thereabove. The heat liberated in the reaction zone is frequently sufficient to raise the temperature of the mixture to 100, 200 or even 300° C., so that it is necessary to use some cooling means when high temperatures are undesirable or detrimental. It is usual to provide some external means for either heating or cooling the reaction chamber in which the voltolization is carried out.

The apparatus used in the present process may be of the usual type of tube or trommel design. The tube type of apparatus comprises a vertical tube preferably constructed of a dielectric material such as glass coated on the outside with a conductor electrode, a central electrode disposed in the center of this tube, provision being made for a high tension silent discharge between the electrodes. The trommel type of apparatus comprises a series of insulated plates placed a few millimeters apart and mounted on a rotatable shaft, the entire shaft with its plates being disposed within a horizontal drum maintained approximately half full of the material to be voltolized. The bottom portions of the plates dip into the material to be voltolized, and as the shaft rotates the material drips down over the surface of the plates forming a thin film thereon. The high tension silent discharge occurs between the plates. In apparatus of this type, it is generally preferred to operate at a pressure below about 20 cm. of mercury and preferably at about 2 to 10 cm., and an electrode potential of about 1000 to 10,000 volts or more at a frequency of about 500 to 10,000 cycles or more per second.

The dehydrogenated oils and waxes may be voltolized according to the present invention in the pure, commercial or crude state or after being purified by treatment with adsorptive clay or other refining agents, solvent extraction, refrigeration in solvent solution followed by decantation or filtration, or in combination with other materials of the types mentioned above or in combination with petroleum, mineral oils, waxes, shale oils, fish oils, animal oils, vegetable oils or derivatives thereof. The materials may also be first partially voltolized and then blended with the other materials indicated above. The voltolization treatment may also be carried out in the presence of gases such as hydrogen, nitrogen, carbon monoxide, carbon dioxide, oxygen, air, and the like. It may also be conducted in the presence of sulfur, halogens, selenium, hydrogen sulfide, oxygen, phosphorus, boron fluoride, ketene, and the like.

The products obtained by voltolization of these materials according to the method described will be found to contain materails having molecular weights ranging from 400 to 1500, 5000, 10,000 or higher, depending upon the extent of the voltolization. These products may be subjected to hydrogenation, heat treatment with reagents such as aluminum chloride, boron fluoride, sulfuric acid, alkali, and the like. They may also be treated or refined with clay, charcoal, acid, and the like.

Products of extremely high molecular weight may be precipitated or extracted from the voltolized product by dilution with solvents such as propane, secondary butyl alcohol, methanol, acetone, carbon tetrachloride, and the like, with or without refrigeration and/or filtration.

The products obtained according to this process may be adapted to a wide variety of different uses. For example, they may be used directly as lubricants, coating compositions, plastics, resins, plasticizers and impregnating agents or they may be used as blending agents in other materials of these types. The amount used may vary from .01% to 1%, to 5%, 10%, 50% or even more.

The products of this process are valuable addition agents to crude petroleum oils, partially or highly treated petroleum oils, white oils, solvent-extracted oils, hydrogenated oils, synthetic oils, as well as to distillation products of tars, lignites, shale, peat, and the like. They are also valuable addition agents to fatty oils, greases, lubricating oils, cable oils, insulating oils, textile oils, industrial lubricants, emulsions, naphthas, Diesel fuels and kerosenes.

The products of this process may be employed in conjunction with materials such as oxidation inhibitors, pour inhibitors, dyes, resins, solvents, thickeners, sludge dispersers, oiliness agents, extreme pressure lubricants, soaps, glycerin, sulfur compounds and the like.

The voltolized products may be used directly as an automobile crankcase lubricating oil, in which case it is desirable to conduct the voltolization only for such a period of time that the viscosity of the initial materials is raised into the range desired. For example, a fraction obtained by the destructive distillation of a solid paraffin wax derived from petroleum at a pressure of about 50 lbs. per square inch, which fraction boils between 300 and 600° F. and contains about 35% of olefins, may be subjected to voltolization for such a period of time that the resulting product has a viscosity between about 30 and 100 seconds Saybolt at 210° F. The duration of treatment required will be determined by the voltolization conditions used, the extent of voltolization being measured by removing small samples of oil from the apparatus at intervals and determining their viscosity.

The dehydrogenated petroleum wax or petrolatum, etc. may also be first treated to concentrate the unsaturated components, which may then be subjected separately to voltolization. For example, the partially dehydrogenated waxes may be dewaxed by chilling in suitable dewaxing solvents, such as propane, thereby precipitating the wax, which is filtered off, leaving liquid products from which the propane is separated by evaporation before, during or after the voltolization treatment. Olefinic components of the dehydrogenated waxes may also be concentrated by extraction with selective solvents such as liquid sulfur dioxide.

If the voltolization is conducted for a longer period of time, products of much higher viscosity and molecular weight may be obtained, which may have even a plastic to solid consistency even after separation from any waxy materials present; for example paraffin wax is chlorinated and then dechlorinated to obtain a product consisting largely of olefins and having a Saybolt viscosity of 36 seconds at 210° F. This product may be voltolized in a glass tube apparatus at a pressure below about 4 cm. of mercury and at an electric potential of 7000 volts at a frequency of 1200 cycles per second until a product having a Saybolt viscosity of 4500 seconds at 210° F. is obtained. This product is a plastic sticky material having rubber-like elastic properties. It is soluble in hydrocarbon solvents and is effective as a sludge dispersing agent when added in small amounts of the order of 1 or 2% to petroleum lubricating oils. 2% of this product blended with a highly refined S. A. E. 10-W petroleum lubricating oil having a Sligh No. of 13.4 resulted in a blend having a Sligh No. of 1.3.

This invention is not to be limited by any of the examples or theoretical explanations given above, all of which are presented for purposes of illustration, but is to be limited only by the following claims, in which it is desired to claim all novelty insofar as the prior art permits.

I claim:

1. Process for the preparation of a hydrocarbon polymerization product effective as a sludge dispersing agent, which comprises dehydrogenating a paraffinic wax, and thereby producing a highly unsaturated heavy hydrocarbon fraction consisting essentially of olefins boiling above the gasoline boiling range, and then subjecting said fraction to the action of silent electrical discharges for a sufficient time to polymerize said olefins into polymers having molecular weights in the range of 400 to about 10,000.

2. A process according to claim 1, in which said paraffinic wax is a normally plastic to solid petroleum wax.

3. A process according to claim 1, in which said dehydrogenating is conducted by mildly cracking the paraffinic wax.

4. A process according to claim 1, in which said dehydrogenating is conducted by chlorinating and then dechlorinating the paraffinic wax.

5. A process according to claim 1, in which said olefins are subjected to the silent electrical discharges for a time sufficient to produce polymerization products of a lubricating oil character.

6. A process according to claim 1, in which the olefins subjected to the action of the silent electrical discharges are concentrated and separated from paraffins in said highly unsaturated heavy hydrocarbon fraction.

7. Improved polymers of olefins boiling above the gasoline boiling range, said polymers being characterized by solubility in hydrocarbon oils, effective sludge dispersing action in highly refined petroleum lubricating oils, and by having molecular weights in the range of 400 to about 10,000, the higher molecular weight polymers having a sticky, plastic to solid consistency with rubber-like elastic properties, said polymers being formed by the action of silent electrical discharges on a highly unsaturated heavy hydrocarbon fraction formed by the dehydrogenation of a paraffinic wax.

8. Improved polymers as described in claim 7, in which said polymers are formed by the action of silent electrical discharges on a highly unsaturated hydrocarbon fraction formed by mildly cracking a paraffinic petroleum wax.

RAPHAEL ROSEN.